United States Patent [19]

Wolff et al.

[11] Patent Number: 4,685,933

[45] Date of Patent: Aug. 11, 1987

[54] CONCENTRATED REACTIVE DYESTUFF SOLUTIONS CONTAINING CYANAMIDE COMPOUND AS STABILIZER

[75] Inventors: Joachim Wolff, Bergisch-Gladbach; Karlheinz Wolf; Werner Marschner, both of Leverkusen, all of Fed. Rep. of Germany

[73] Assignee: Bayer Aktiengesellschaft, Leverkusen, Fed. Rep. of Germany

[21] Appl. No.: 748,267

[22] Filed: Jun. 24, 1985

[30] Foreign Application Priority Data

Jul. 13, 1984 [DE] Fed. Rep. of Germany ....... 3425813
Feb. 13, 1985 [DE] Fed. Rep. of Germany ....... 3504964

[51] Int. Cl.⁴ ............................................. C09B 67/44
[52] U.S. Cl. ............................................. 8/527; 8/532; 8/549; 8/585; 8/586; 8/587; 8/917; 8/918
[58] Field of Search .................... 8/527, 549, 585, 586

[56] References Cited

U.S. PATENT DOCUMENTS 4,120,648 10/1978 Agarwal et al. ...................... 8/85 R
4,452,606 6/1984 Vandiest et al. ........................ 8/496

FOREIGN PATENT DOCUMENTS 2051139 1/1981 United Kingdom ................... 8/549

Primary Examiner—A. Lionel Clingman
Attorney, Agent, or Firm—Sprung Horn Kramer & Woods

[57] ABSTRACT

Concentrated aqueous solutions of dyestuffs having water-solubilizing groups which contain cyanamides of the formula

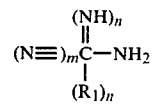

wherein
  $R_1$=NHCN, NHCONH$_2$ or NHCONHCH$_3$ where n=0 and
  m=1 or n=1 and m=0, have a long shelf life, in particular also in the case of reactive dyestuffs.

3 Claims, No Drawings

CONCENTRATED REACTIVE DYESTUFF SOLUTIONS CONTAINING CYANAMIDE COMPOUND AS STABILIZER

The present invention relates to concentrated aqueous solutions, having a long shelf life, of organic dyestuffs which contain water-solubilising groups, characterised in that they contain cyanamides of the general formula

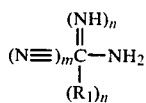

wherein $R_1 =$ NH—C≡N

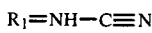

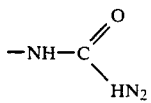

where
n=0 and m=1 or
n=1 and m=0.
Preferred compound (1) is dicyanodiamide of the formula

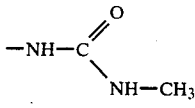

The solutions contain in general 0.1–15% by weight of a compound (1), preferably 1% by weight to 10% by weight.

The solutions may contain solubility-increasing water-miscible organic compounds, for example ethoxylated ammonium compounds, lower aliphatic or cyclic amides, preferably ε-caprolactam and N-methylpyrrolidone and/or lower aliphatic sulphoxides and/or sulphur-containing compounds, such as dimethyl sulphone, diethyl sulphone, sulpholane, sulpholene and their α- and/or β-substituted derivatives and/or hydrotropic compounds such as thiourea and urea, and their derivatives, particularly preferably N,N'-dimethylurea. If non-reactive dyestuffs are used it is also possible to use mixtures with amine, such as, for example, triethylamine, triethanolamine and similar derivatives and mixtures with glycols and their ethers.

The solutions can also contain customary standardising agents or additives, for example inorganic salts of the type obtained in the synthesis, generally about 0–10% by weight, preferably 5% by weight, buffer substances, dispersants, in particular anionic dispersants, for example condensation products of aromatic sulphonic acids, such as naphthalenesulphonic acids, sulphonic acids of ditolyl ethers or terphenylsulphonic acids, and formaldehyde.

Anionic or cationic dyestuffs can in principle be of any type, provided they have water-solubilising groups. They can be members of all the various classes, for example of the family of metal-free or metal-containing monoazo or polyazo dyestuffs, metal-free or metal-containing azaporphine dyestuffs, such as copper-, cobalt- or nickel-phthalocyanine dyestuffs, of the anthraquinone, oxazine, dioxazine, triphenylmethane, nitro, azomethine, metal-free or metal-containing formazan dyestuffs.

They are described for example in "Colour Index" 3rd edition, Volume 1, pages 1001 to 1562.

The anionic dyestuffs contain for example as water-solubilising group one or more COOH groups, but preferably SO₃H groups or salts thereof.

Reactive dyestuffs are to be understood as meaning dyestuffs which have one or more reactive groups or detachable substituents which, on application of the dyestuffs to cellulose materials in the presence of acid-binding agents and optionally under the action of heat, are capable of reacting with the hydroxyl groups of cellulose or, on application to superpolyamide fibres, such as wool, are capable of reacting with the NH groups of these fibres to form covalent bonds.

Suitable reactive groups which contain at least one detachable substituent bonded to a heterocyclic radical are among others those which contain at least one reactive substituent bonded to a 5- or 6-membered heterocyclic ring, such as to a monazine, diazine, triazine, for example pyridine, pyrimidine, pyridazine, thiazine, oxazine or asymmetrical or symmetrical triazine ring, or to such a ring system which has one or more fused-on rings, such as a quinoline, phthalazine, cinnoline, quinazoline, quinoxaline, acridine, phenazine or phenanthridine ring system; the 5- or 6-membered heterocyclic rings which have at least one reactive substituent are accordingly preferably those which contain one or more nitrogen atoms and can contain fused-on 5- or preferably 6-membered carbocyclic rings.

Of the reactive substituents on the heterocycle, there are to be mentioned for example:
halogen (Cl, Br or F), azido-(N₃), thiocyanato, thio, thiolether, oxyether.

In the case of the present invention preference is given to reactive dyestuffs having reactive groups based on the following systems:
monohalogeno- or dihalogeno-symmetrical triazinyl radicals, monohalogenopyrimidinyl, dihalogenopyrimidinyl or trihalogenopyrimidinyl radicals or halogen-substituted quinoxalinylcarbonyl radicals.

Preference is given in particular to the following reactive groups of the formulae (3), (4) and (5):

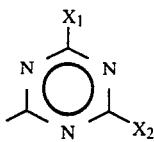

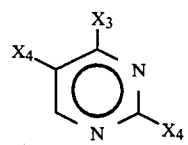

-continued

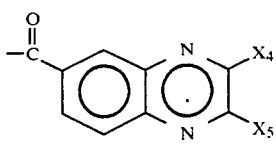
(5)

where in the formulae (3), (4) and (5):
$X_1 = F$
$X_2 = Cl, F, NH_2, NHR^2, OR^2, CH_2R^2, SR^2$
$X_3 = Cl, F, CH_3$
$X_4 = Cl, F$, and,
$X_5 = Cl, F, CH_3$ and where
$R^2$ = alkyl (in particular $C_1-C_4$-alkyl which is optionally substituted by OH, $SO_3H$ or COOH), aryl (in particular phenyl which is optionally substituted by $SO_3H$, $C_1-C_4$-alkyl or $C_1-C_4$-alkoxy) aralkyl (in particular benzyl which is optionally substituted by $SO_3H$, $C_1-C_4$-alkyl or $C_1-C_4$-alkoxy)

Dyestuffs which contain the abovementioned reactive group systems are known for example from the following publications:
U.S. Pat. Nos. 3,377,336, and 3,527,760, British Pat. No. 1,169,254, U.S. Pat. No. 3,669,951, German Patent No. Specification No. 1,644,208, British Patent Specification No. 1,188,606, DE-OS (German Published Specification) 2,817,780, Spanish Patent Specification No. 479,771.

Of the non-heterocyclic reactive radicals should be mentioned, for example, β-chloroethylsulphonyl, β-acetoxyethylsulphonyl, β-sulphatoethylsulphonyl, β-thiosulphatoethylsulphonyl, β-sulphatoethylsulphonylmethylamino and vinylsulphonylmethylamino groups.

The reactive dyestuffs contained in the preparations according to the invention can also contain combinations of two reactive radicals.

Preferred solutions of anionic dyestuffs, in particular reactive dyestuffs, contain:
7-35% by weight of anionic dyestuff, in particular reactive dyestuffs
0-30% by weight of solubility-increasing water-miscible organic compounds and/or hydrotropic compounds and/or dispersants
0.1-15% by weight of compounds of the formula (1)
0-10% by weight of inorganic salts, preferably <5% by weight
0-5% by weight of buffer substances to 100% by weight of water Suitable buffer substances are in particular those for the pH range 4.5 to 8.5% by weight of boric acid, phosphate buffer and hydrogencarbonate buffer.

Water-soluble cationic dyestuffs are those which possess a coloured cation and a colourless anion. Suitable cationic dyestuffs are in particular onium-containing dyestuffs of the diarylmethane, triarylmethane, methine, azo, anthraquinone, rhodamine, thiazine and oxazine family, as described for example in "Colour Index", 3rd edition, Volume 1, pages 1607 to 1688, and by K. Venkataraman in "The Chemistry of Synthetic Dyes", (1977), Volume IV, pages 159-206.

Preferred solutions of cationic dyestuffs contain:
7-35% by weight of cationic dyestuff
0.1-15% by weight of compound of the formula (1)
0-10% by weight of inorganic salts, preferably <5% by weight
0-30% by weight of water-miscible organic compounds and/or hydrotropic compounds and/or nonionic or cationic dispersants
0-10% by weight of inorganic or organic acids and to 100% weight of water Examples of suitable water-miscible organic compounds and/or hydrotropic compounds are:
monohydric and polyhydric alcohols and their ethers, water-soluble aliphatic or cyclic amides, lactams, lactones, ethoxylated ethanolamines or optionally oxy-containing nitriles, such as, for example, dimethylformamide, ε-caprolactam, N-methylpyrrolidone, -butyrolactone, acetonitrile, hydroxypropionitrile, ethylene carbonate, ethylglycol, diethylene glycol monoethyl ether or reaction products of triethanolamine or triethanolammonium hydroxide with ethylene oxide.

Other suitable additives are nonionic surfactants, such as long-chain ethoxylated amines, alcohols and phenols, and inorganic or organic acids, such as, for example, formic acid, methanesulphonic acid, acetic acid, citric acid or lactic acid.

The solutions are advantageously prepared with dyestuffs which ideally have a low (usually synthesis-derived) proportion of organic salts (sulphates, chlorides and so on).

These low-salt products can be obtained in various ways:
(a) The salt-containing press cake of the dried salt-containing factory material is repeatedly washed with distilled water and isolated again.
(b) The dyestuff slurry produced in the synthesis is desalted by means of pressure permeation and concentrated (DE-A No. 2,948,292).
(c) A suitable method especially for dyestuffs which contain heterocyclic reactive groups is for example the preparation of the solution directly for synthesis in accordance with DE-A No. 3,207,534 or DE-A No. 2,529,657.

The concentrated solutions according to the invention are distinguished by a long shelf life at temperatures of $-10°$ C. to $30°$ C. It is surprising to a high degree that if compounds of the formula (1) are added to solutions of reactive dyestuffs there is no hydrolysis even after 4 weeks of storage at $40°$ C.

Reactive dyestuff solutions which have a long shelf life are already known: DE-A Nos. 2,529,658, 2,948,292 and 3,207,534. The solvents mentioned there, however, give unsatisfactory results with a whole number of dyestuffs.

For instance, it has not been possible heretofore to prepare solutions which have a sufficiently long shelf life at elevated temperatures (4 weeks at $50°$ C.) of azo dyestuffs of the J acid type which contain pyrimidine reactive groups, for example the dyestuff of the formula (6), in the presence of solubilisers.

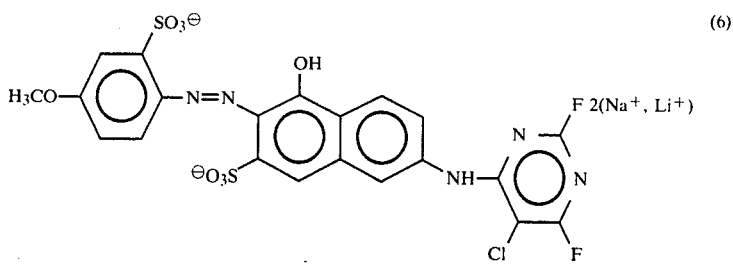

(6)

It has been found to be highly surprising that the addition of only 2.3% by weight of dicyanodiamide (formula 2) to a suspension comprising 11% by weight of reactive dyestuff of the formula (6), about 1% by weight of Li$_2$SO$_4$ and 88% by weight of water at pH 7 leads to a dyestuff solution which has a shelf life of weeks. Also in the case of other reactive dyestuff solutions, low concentrations of dicyanodiamide have been found to be extremely effective solubilisers.

The reactive dyestuff preparations according to the invention have in particular the advantage that they produce high colour yields even at high dyeing temperatures (>160° C.), which are for example customary in practice with polyester/cotton blend fibres and after the addition of the auxiliaries customary for reactive dyeing.

Preferred reactive dyestuff solutions according to the invention include in particular also those which contain dyestuffs of the type

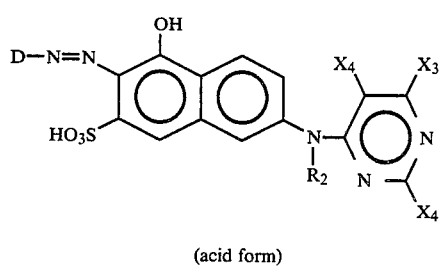

(7)

(acid form)

wherein
D = radical of a sulphur-containing diazo component of the benzene or naphthalene series,
R$_2$ = H, CH$_3$ or C$_2$H$_5$, in particular those having the radical

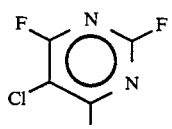

(8)

The concentrated dyestuff solutions according to the invention, even if they do not contain solubilisers which are liquid at room temperature, can be dried and subsequently ground to give a powder. Before and after the drying it is possible to mix in further customary standardising agents and/or buffer substances.

EXAMPLE 1

2.5 g of dicyanodiamide are added at 20° C. with stirring to 997.5 g of an aqueous suspension which contains 11% by weight of the reactive dyestuff

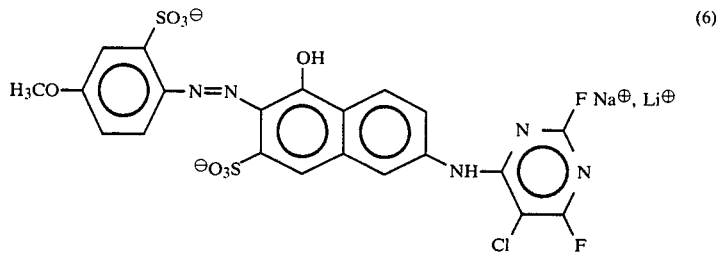

(6)

about 1% by weight of inorganic salts, such as Li$_2$SO$_4$, LiCl or Na$_2$SO$_4$, and 0.5% by weight of boric acid. A short time later the result is a solution of the reactive dyestuff (6) which has a long shelf life. There is no significant hydrolysis of the dyestuff even after 4 weeks of storage at 40° C. After addition of the auxiliaries customary for reactive dyeing, the solution according to the invention is directly suitable for dyeing natural and regenerated cellulose fibres in a reddish yellow shade.

EXAMPLE 2

1 mol of the anthraquinone dyestuff of the formula

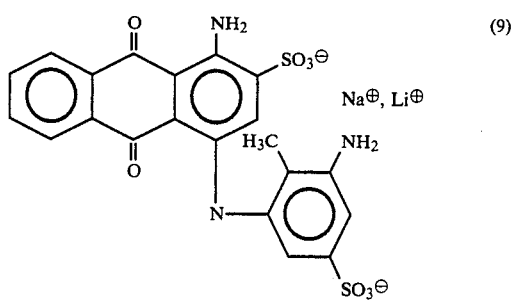

(9)

are reacted at pH 5.5 with 1.0 mol of 2,4,6-trifluoro5-chloropyrimidine in a solution of 17 g of dicyanodiamide and 2,650 g of water. The pH is maintained at 5.5 during the reaction by addition of Li$_2$CO$_3$. After the reaction has ended, the dispersion has added to it sufficient ε-caprolactam, dicyanodiamide, boric acid and water that the resulting reactive dyestuff solution corresponds to the following composition:
15% of reactive dyestuff
17% of ε-caprolactam
3% of dicyanodiamide
2% of lithium salts
0.5% of boric acid
to 100% by weight of water The solution has a shelf life of months at temperatures of 0° C. to 40° C. After addition of the auxiliaries customary for reactive dyeing the solution according to the invention is directly suitable for dyeing natural and regenerated cellulose fibres in a brilliant blue shade.

EXAMPLE 3

1 mol of the Cu-azo dyestuff of the formula

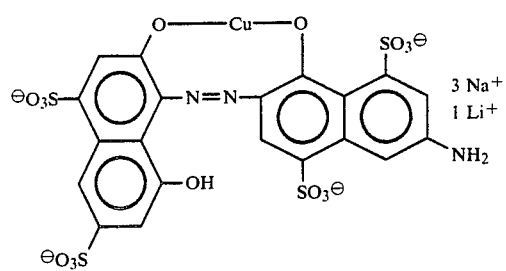

(10)

is dissolved in 6.2 l of water, 800 g of ε-caprolactam and 240 g of dicyanodiamide. The dyestuff (10) is reacted at 20° C. and pH 5.5 with 1 mol of 2,4,6-trifluoro-5-chloropyrimidine, the pH being kept constant during the reaction by addition of $Li_2CO_3$. After the reaction has ended, sufficient ε-caprolactam, dicyanodiamide, boric acid and water is added that the resulting reactive dyestuff solution corresponds to the following composition:
8.5% of reactive dyestuff
10% of ε-caprolactam
1% of Li salts
3% of dicyanodiamide
0.5% of boric acid
to 100% by weight of water

EXAMPLE 4

1 mol of the anthraquinone dyestuff of the formula

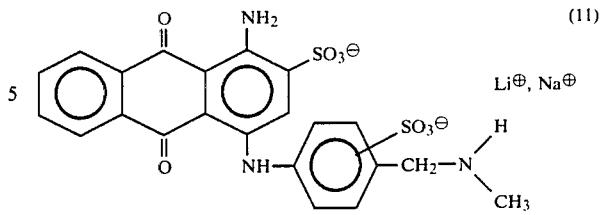

(11)

is almost dissolved in 400 g of N,N'-dimethylurea, 80 g of dicyanodiamide and 1,300 g of water and is reacted at 25° C. with 1.05 mol of 2,3-dichloroquinoxalinecarbonyl chloride in the course of 3 h. The pH is maintained at 7.5 during the reaction by addition of $LiOH.H_2O$. After the reaction has ended, sufficient N,N'-dimethylurea, dicyanodiamide, boric acid and water is added that the resulting reactive dyestuff solution, after hydrolysed 2,3-dichloroquinoxalinecarbonyl chloride has been filtered off, corresponds to the following composition:
20% of reactive dyestuff
20% of N,N'-dimethylurea
3% of dicyanodiamide
1% of Li salts
0.5% of boric acid
ad 100% by weight of water The resulting solution has a shelf life of months at temperatures of 0° C. to 30° C.

EXAMPLE 5

1 mol of the low-salt reactive dyestuff

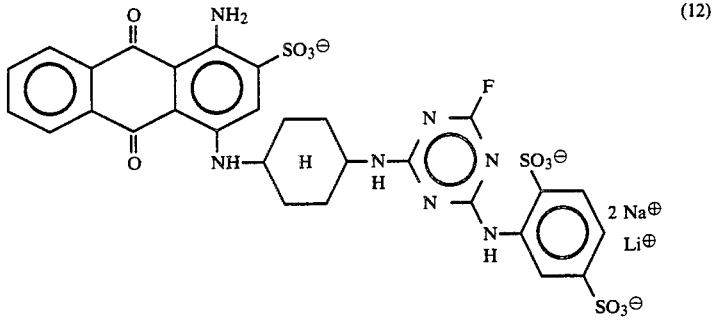

(12)

is dissolved in 1,000 g of ε-caprolactam, 4,500 g of water and 210 g of dicyanodiamide and the solution is brought to pH 8.5 with a little $LiOH.H_2O$, is buffered with phosphate and is diluted to such an extent that the final solution contains:
11.5% of reactive dyestuff (12)
15% of ε-caprolactam
3% of dicyanodiamide
0.5% of $Na_2HPO_4$
1% of $Na_2SO_4$, NaCl
to 100% by weight of water

EXAMPLE 6

1 mol of the low-salt (<4% of $Na_2SO_4$) reactive dyestuff of the formula (13)

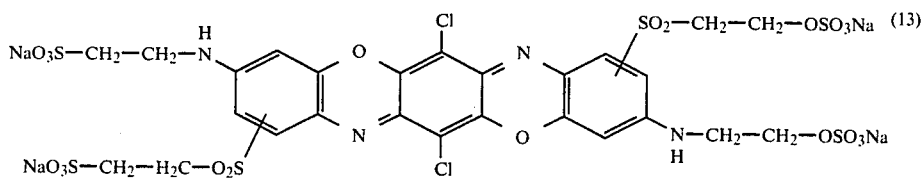

is dissolved at pH 4–5 in 150 g of dicyanodiamide and 6,400 g of water. The result is a reactive dyestuff solution which has a long shelf life and which, after addition of the auxiliaries customary for reactive dyeing, is directly suitable for dyeing natural and regenerated cellulose fibres in a brilliant blue shade.

EXAMPLE 7

1 mol of the low-salt (<3% of NaCl, Na$_2$SO$_4$) reactive dyestuff of the formula

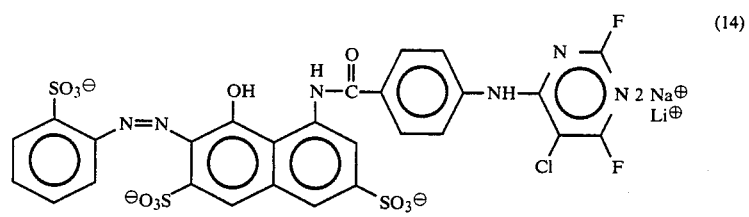

is dissolved at pH 7.5 in 1,100 g of ε-caprolactam, 200 g of dicyanodiamide and 4,600 g of water. After standardisation with 0.5% of boric acid (pH standardised with LiOH) the result is a solution which has a long shelf life.

EXAMPLE 8

1 mol of the low-salt (<3% of NaCl, Na$_2$SO$_4$) reactive dyestuff of the formula

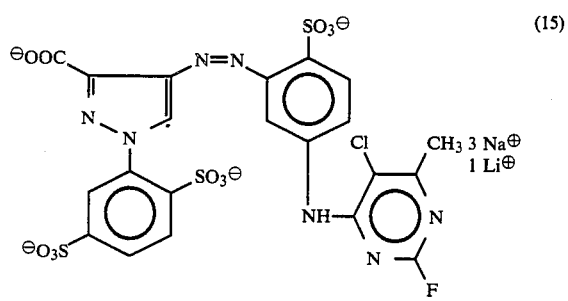

is dissolved at pH 8.5 in 1,200 g of ε-caprolactam, 70 g of dicyanodiamide and 4,900 g of water. After addition of 30 g of NaHCO$_3$ the result is a solution which has a shelf life of months.

EXAMPLE 9

1 mol of the low-salt (<3% of Na$_2$SO$_4$) acid dyestuff of the formula

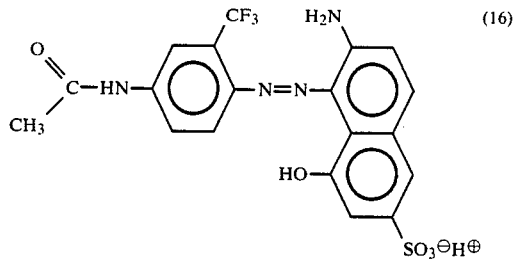

is dissolved in 1,080 g of ethyldiglycol, 650 g of water, 830 g of the ammonium compound of the formula (17)

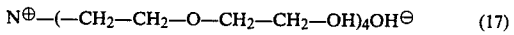

and 61 g of dicyanodiamidine

The solution has a shelf life of months and can be used in conventional manner directly for dyeing superpolyamide fibres.

EXAMPLE 10

A dyestuff dispersion containing 17% of the dyestuff of the formula

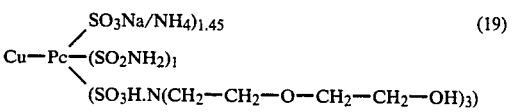

and 2.5% of NH$_4$Cl in 76% of water is dissolved by addition of 2.5% of 2-diethylaminoethanol hydrochloride and 2% of dicyanodiamide. The solution which has a long shelf life is suitable for dyeing paper.

EXAMPLE 11

10 l of an aqueous reaction solution which contains 3% of dyestuff of the formula 4,685,933

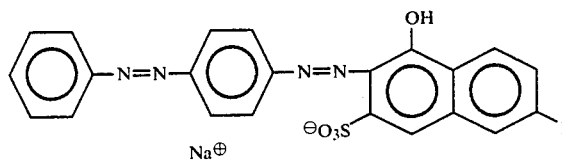

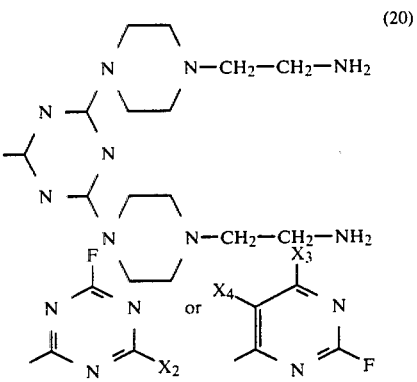

0.25 g of a customary cationic water-soluble dispersant, 0.6% of methanesulphonic acid and 0.6% of dicyanodiamide are subjected at 40° C. and 40 bar to pressure permeation in a laboratory instrument with 0.36 m² of a membrane of an aromatic polysulphone having a separating limit at a molecular weight of 6000, to be stripped in the course of 140 min of continuous feed of 14 l of pure water of virtually dyestuff-free salt-containing permeate. Afterwards the solution is concentrated to 3.3 l in the course 70 min. The result is a solution having the following composition:

10% of dyestuff of the formula (20)
0.5% of cationic dispersant
2% of dicyanodiamide
about
2% of methanesulphonic acid
to
100% by weight of water

EXAMPLE 12

1 mol of 2-(4'-aminophenyl)-6-methylbenzothiazole-7-sulphonic acid is brought to pH<1 in 2,700 ml of water with 2.5 mol of HCl. 1.05 mol of $NaNO_2$ in the form of a 30% solution are added at 0° C. After 1 h excess nitrite is destroyed with sulphamic acid, and the diazotisation is added to a suspension of 1.02 mol of barbituric acid in 450 ml of water. The pH during the coupling is maintained at 7 by addition of a mixture of 0.5 part of triethanolamine and 0.5 part of triisopropanolamine. The suspension is diafiltered through a pressure permeation system with 0.36 m² of a membrane of polysulphone having a separating limit at a molecular weight of 3000, and the filtrate is concentrated. After standardisation with urea, dicyanodiamide and further triisopropanolamine/triethanolamine the result is a solution having the following composition:

15% of dyestuff of the formula (21)
3% of triisopropanolamine
3% of triethanolamine
2% of dicyanodiamide
25% of urea
to 100% by weight of water

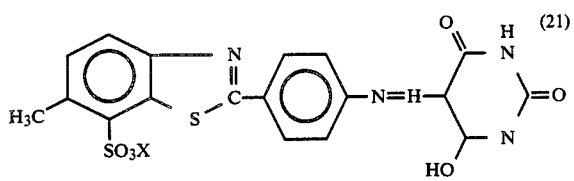

$X=0.5 [NH(C_2H_4OH)_3]^\oplus, 0.5 [NH(C_3H_6OH)_3]^\oplus$.

We claim:

1. An aqueous solution of a reactive dyestuff with reactive groups of the formula

wherein
$X_2$=Cl, F, $NH_2$, $NHR^2$, $OR^2$, $CH_2R^2$, $SR^2$
$X_3$=Cl, F, $CH_3$
$X_4$=Cl, F and wherein $R^2=C_1-C_4$-alkyl, optionally substituted by OH, $SO_3H$ or COOH containing 7-35% by weight of said reactive dyestuff, 0-30% by weight of lower aliphatic or cyclic amides, lower aliphatic sulphoxides, dimethylsulphone, diethyl-sulphone, sulpholane, thiourea and urea and their derivatives, and 0.1-15% by weight of a compound of the formula $$(N\equiv)_m \overset{(NH)_n}{\underset{(R_1)_n}{C}}-NH_2 \quad (1)$$

where

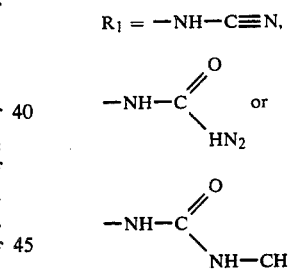

where
n=0 and m=1 or
n=1 and m=0.

2. A solution according to claim 1 containing a dyestuff of the formula

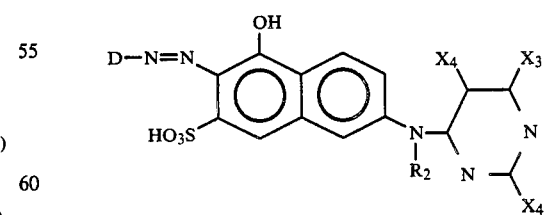

wherein
D=radical of a sulpho-containing diazo component of the benzene or naphthalene series and
$R_2$=H, $CH_3$, $C_2H_5$.

3. A solution according to claims 1 or 2 containing ε-caprolactam.

* * * * *